UNITED STATES PATENT OFFICE.

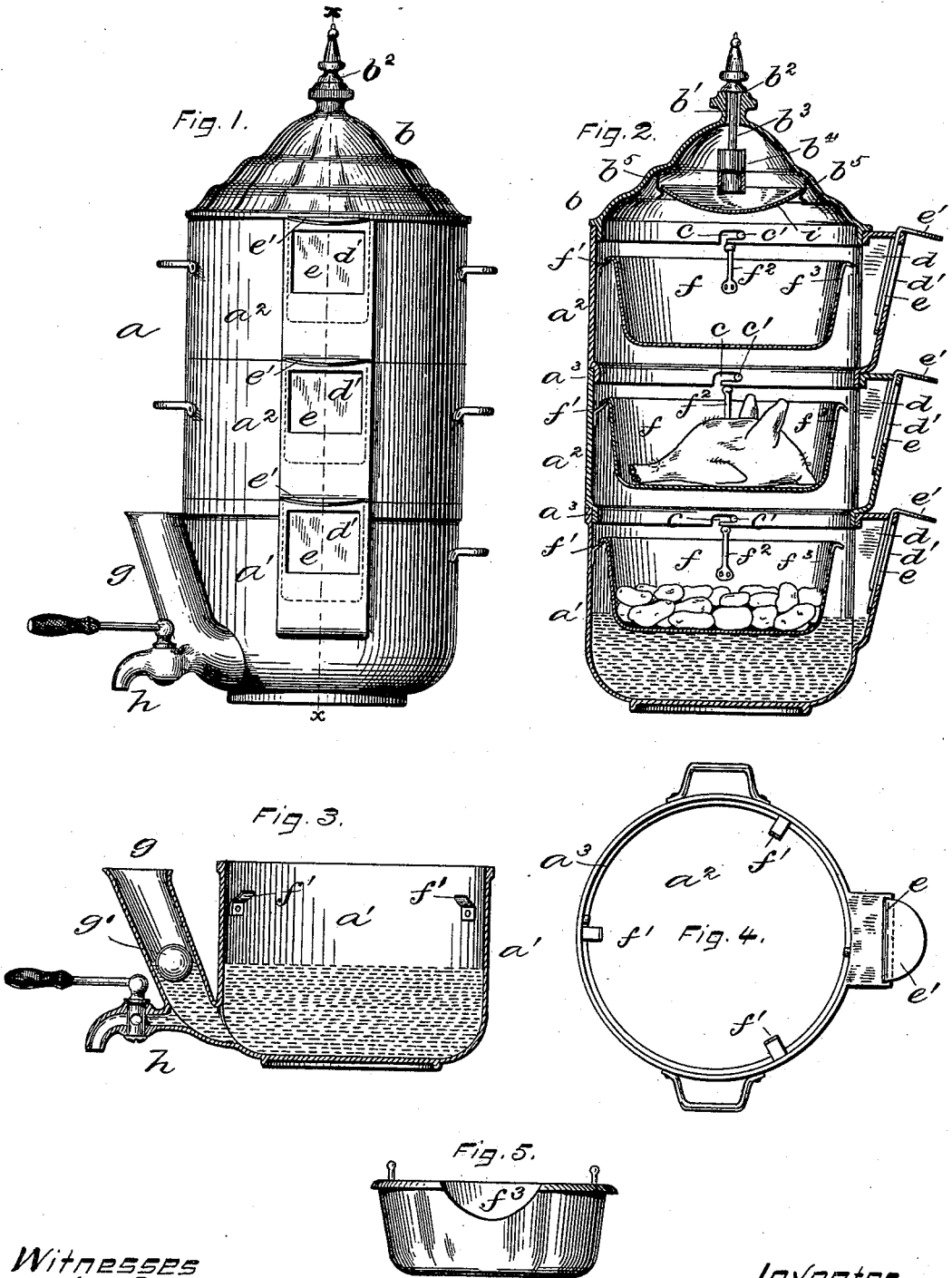

ALICE M. HOBSON, OF NEW BRITAIN, CONNECTICUT.

STEAM-COOKER.

SPECIFICATION forming part of Letters Patent No. 466,137, dated December 29, 1891.

Application filed March 27, 1891. Serial No. 386,639. (No model.)

*To all whom it may concern:*

Be it known that I, ALICE M. HOBSON, a citizen of the United States, residing at New Britain, in the county of Hartford and State of Connecticut, have invented certain new and useful Improvements in Steam-Cookers, of which the following is a specification.

The invention relates to the class of culinary utensils which are adapted for cooking or parboiling edibles by steam or vapor; and the object of the invention is to provide a simple and cheap article of this class, which can be quickly arranged for steaming several kinds of food at the same time, and which is provided with simple means, whereby the food in either section may be tested and its condition observed without disturbing the food in the remaining sections, and also to provide means for venting the kettle and collecting the water of condensation incidental to said venting to prevent it from entering the food-trays or water-receptacle.

Referring to the accompanying drawings, Figure 1 is a side elevation of the cooker. Fig. 2 is a central vertical section on plane denoted by the broken line $x\,x$ of Fig. 1, illustrating the use of the cooker. Fig. 3 is a vertical section of the liquid-receptacle on a plane passing through the inlet and outlet. Fig. 4 is a plan view of one of the upper sections with the cover removed. Fig. 5 is a side view of one of the food-trays.

In the views, the letter $a$ indicates the shell of the cooker, which is preferably made of thin metal in any number of sections $a'\,a^2$, the bottom of the lower section $a'$, which holds the liquid to be transformed into vapor, usually being adapted to set into the lid-opening of a stove or over any other source of heat, while the sections $a^2$ are open and have their edges provided with flanges $a^3$, so that the sections will fit together with tight joints when placed one upon the other. For the upper section a tight-fitting cover $b$ is provided. These sections are preferably held together by providing the inward-projecting flange on their lower edge with an angle or bayonet slot $c$, into which passes the pin or stud $c'$, projecting from the upper edge of the sections, so that the whole device may be lifted as one piece when put together. A portion of one side of the walls of each of the sections is offset, forming a small chamber $d$, and an opening $d'$ is made in the front of this chamber, over which is placed a slide $e$, having a handle $e'$, by means of which it may be lifted. The front side of the chamber $d$, in which the opening $d'$ is made, slants obliquely outward and upward, as shown in Fig. 2, whereby the slides $e$ will not be in the way of each other in the series of ring-sections, and at the same time the opening $d'$ at the upper part of each section is of a sufficient size to furnish convenient access to the interior, and the slide has a sufficient range of motion so as to fully cover and uncover the ample opening of each chamber. Near the top of the inside of each of the sections are inward and upward projecting lugs $f'$, that extend under a flange on the edge of the pans or trays $f$, in which the food that it is desired to cook is placed. These trays are usually provided with handles $f^2$ for lifting them, and a portion of the side walls of the trays is preferably cut away, as shown at $f^3$, in order that the contents of the tray may be observed, or a testing-fork or stirring-spoon may be thrust into the food through the opening $d'$ in the side walls of the several sections to determine the condition of the food.

The lower section $a'$, which is adapted to receive the liquid and is set over the source of heat, is provided on one side with an upward and outward projecting funnel $g$, that opens into the lower part of the receptacle, through which water may be poured to fill or replenish the supply for producing the vapor. This funnel is preferably provided with a float-valve $g'$ to close the orifice against the escape of vapor. A cock or faucet $h$ is attached to the lower receptacle, preferably at the bottom of the funnel $g$, so that the receptacle may be emptied of water when desired by opening the cock. Through the top of the cover $b$ is an opening $b'$, upon which is placed a movable stopper or valve $b^2$, having a reduced stem $b^3$, provided with an inverted-cup-like weight $b^4$, which serves to keep the valve-stem in an upright position. When the pressure of the steam within the cooker and surrounding the valve-stem is greater upon the under surface of the valve than the external atmospheric pressure on the outside, the valve will rise sufficiently to let the steam escape to prevent an explosion. The escaping steam in the vicinity of the valve is likely to condense, and if it were allowed to drop into one of the pans or into the water in the lower section it would taint the same with the odor of the articles within the cooker. In order to prevent this I support the drip-pan $i$ under the valve and surrounding part of the cover on spring-fingers $b^5$ to catch and retain the water of condensation that results from the opening of said vent-valve. This pan can be made of any capacity that may be desired. Any number of these sections may be used, depending upon the number of varieties of food which it is desired to cook, and each kind of food may be subjected to inspection at any time without disturbing the rest. The water may be replenished or removed at any time without removing the cooker from the stove or interfering with the cooking.

By the employment of the drip-pan under the vent the water in the lower section is kept in a pure state, so that it may be used in preparing drinks and the like—as, for instance, in making tea or coffee.

I am aware that prior patents show and describe a dinner-pail having a lamp-chamber with a slide-door for use in lighting and adjusting the lamp-wick; a baker's oven with a door for furnishing access to the interior, a cooking-steamer with several trays, and a single door substantially the size of the whole side of the steaming-chamber; baking-pans in pairs, hinged together, with the top pan having a vent-hole, with a sliding cover in one case and with a swinging cover in another; a single baking-pan with a slide in one side covering a very shallow opening at the bottom of the pan; various steam-cookers and other articles having immovable glass or mica windows for inspecting the interior by sight; steam-cookers consisting of a kettle-section, one ring-section fitting the top thereof, and a cover said to fit either the ring-section or the kettle, in some instances the same being provided with means of "bayonet-lock" order for locking them together; steam-cookers having a series of trays stacked one upon the other inside of a common steam-chamber; steam-cookers in which the kettle was provided with a filling-tube and stop-cock; a steam-cooker having a water seal to close the vent upon the accumulation of the water of condensation. All of said prior art is hereby disclaimed.

In my cooker there is not only a water receptacle or kettle, top section, and cover, but a series of duplicate interchangeable ring-sections, either or any of which will fit the lower section or kettle, while the cover will fit the top of either or any of the ring-sections and the kettle-section also, there being one tray or cooking-disk for each section, so that the kettle may be built up to any desired height, according to the number of dishes to be cooked, while at the same time the interior of any section is accessible for a testing-fork or the like without disturbing or removing any of the ring-sections or even the cover. My cooker has many other advantages, some of which have heretofore been pointed out.

I claim as my invention—

1. A steam-cooker consisting of a vessel-like base-section $a$ for holding liquid, a series of superimposed duplicate ring-sections interchangeably fitting each other and said base-section and having internal supporting-lugs, food-trays supported by said lugs, and a cover fitted to the top of either section, substantially as described, and for the purpose specified.

2. A steam-cooker consisting of a number of superimposed interchangeable sections and a cover, the lower edges of the sections, except the lower one, being of the same form and size, while the tops of all the sections are alike in form, construction, and size and fitted to said lower edges, lock-joints at the meeting edges of said sections and cover, and food-supporting trays in the respective sections, substantially as described, and for the purpose specified.

3. A steam-cooker consisting of a vessel-like base-section having internal lugs, an access-opening and slide for covering the same, a series of superimposed duplicate ring-sections and a cover fitted to each other and said base-section, said ring-sections being also provided with internal lugs, access-opening and slide for covering the same, and food-supporting trays fitted to rest upon the internal lugs of the respective sections, substantially as described, and for the purpose specified.

4. A steam-cooker consisting of a number of superimposed sections, the lower one of which is the water-receptacle, trays supported in said sections and a cover having the drip-pan $i$ supported therein, and the movable stopper or valve $b^2$ above said pan, substantially as described, and for the purpose specified.

5. A section for a steam-cooker, having a projecting offset forming a small chamber $d$ at one side outside of the body of said section, an opening in the front side wall of said chamber, and a slide movably held over said opening and provided with a handle, substantially as described, and for the purpose specified.

6. A steam-cooker consisting of a number of superimposed sections and inclosed trays, each of which sections is provided with an offset forming a small chamber $d$, the front side of which slants obliquely outward and upward and is provided at its upper part with the opening $d'$, and a slide or cover having a handle for covering said opening, substantially as described, and for the purpose specified.

7. A steam-cooker consisting of a number of superimposed sections and inclosed trays, each of which sections is provided with an access-opening and cover at a point mainly above the adjacent upper edge of the tray within each section, substantially as described, and for the purpose specified.

8. The herein-described steam-cooker, consisting of a vessel-like base-section having the filling-funnel $g$ and stop-cock $h$, a series of superimposed ring-sections, trays supported within said sections, and a cover having the vent-valve and drip-pan under said valve, all substantially as described, and for the purpose specified.

ALICE M. HOBSON.

Witnesses:
JOHN EDWARDS, Jr.,
JOHN P. BARTLETT.